United States Patent [19]
Kunoth

[11] 3,776,174
[45] Dec. 4, 1973

[54] GAS PRESSURE OPERATED WARNING DEVICES

[76] Inventor: Kenneth Henry Kunoth, 40 Hineinoa St., Rotorua, New Zealand

[22] Filed: Mar. 13, 1972

[21] Appl. No.: 234,133

[30] Foreign Application Priority Data
Mar. 12, 1971 New Zealand.................... 163059

[52] U.S. Cl................. 116/34 R, 73/146.8, 137/227
[58] Field of Search................. B60c/23/02; 116/34, 116/65, 67, 70; 73/146.3, 146.8; 137/227; 152/415, 429, 431

[56] References Cited
UNITED STATES PATENTS

| | | |
|---|---|---|
| 1,424,278 | 8/1922 | Brown................................ 116/34 R |
| 1,769,508 | 7/1930 | Harned............................. 116/34 R |
| 2,921,551 | 1/1960 | Hagger.................................. 116/70 |
| 2,967,508 | 1/1961 | Hovorka.......................... 116/34 R |
| 3,051,122 | 8/1962 | Gorini............................... 116/34 R |
| 3,618,630 | 11/1971 | Marcaccio........................... 137/227 |

Primary Examiner—Louis J. Capozi
Attorney—Farley, Forster & Farley

[57] ABSTRACT

A gas pressure operated warning device which is particularly suitable for attachment to the valve stems of pneumatic tires of motor vehicles and which produces an audible noise when the gas pressure falls below a critical value.

5 Claims, 2 Drawing Figures

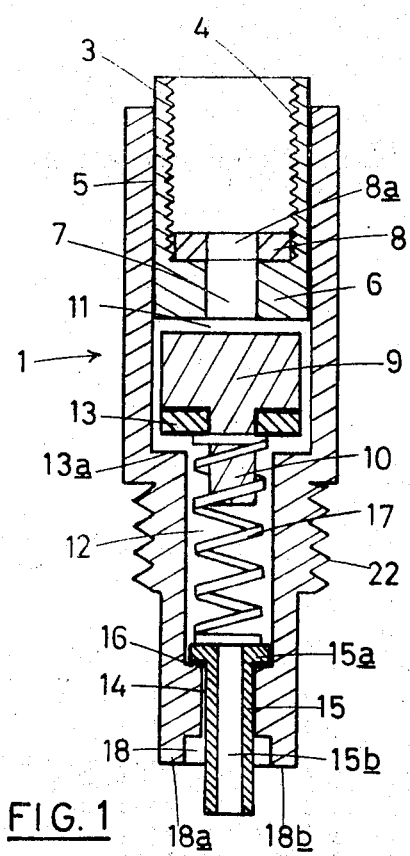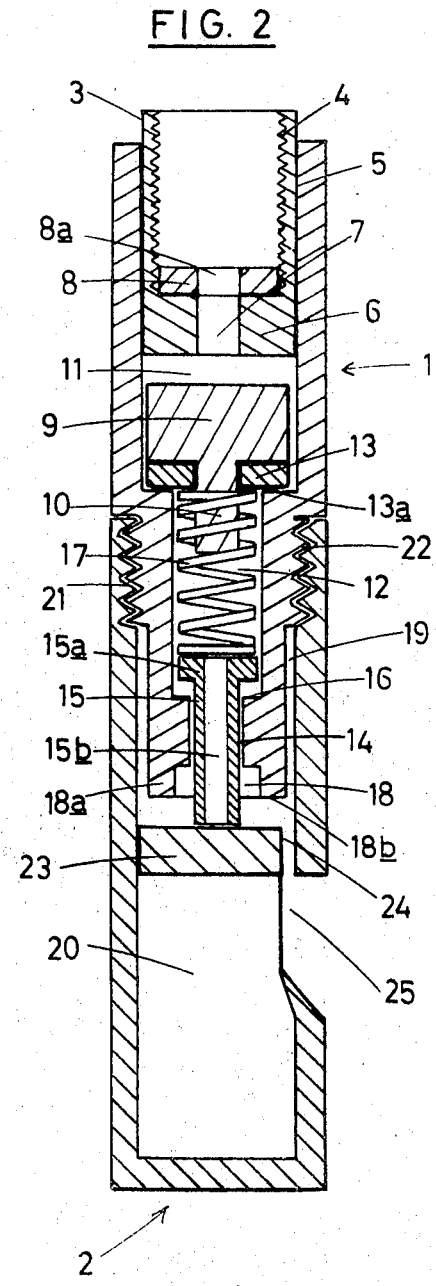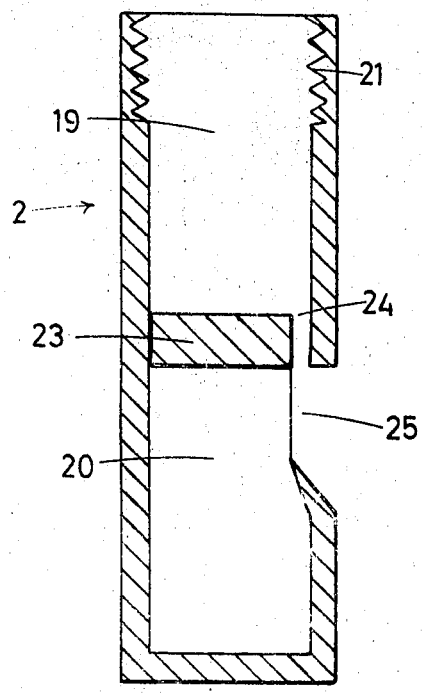

GAS PRESSURE OPERATED WARNING DEVICES

This invention relates to a gas pressure operated warning device for use in indicating a reduction in gas pressure.

The invention is particularly suitable for application to the pneumatic tyres of motor vehicles and for convenience the following description is mainly directed towards the use of the device in conjunction with motor vehicle pneumatic tyres. However, it will be readily apparent that such a device may be employed to indicate a fall in gas pressure below a predetermined limit within any article which is required to maintain a degree of internal gas pressure and that the following description is not intended to limit the scope of the invention which is defined solely by the appended claims.

When a motor vehicle tyre is punctured there is frequently a time-lapse before the puncture is detected by the driver of the vehicle. During this time lapse, substantial damage to the type and/or tyre-tube may occur. Transport trucks and the like are especially prone to excessive tyre damage from this cause as it is usually difficult for the driver to detect a puncture until it is too late.

One of the objects of the invention is to provide a device which is attachable to an article containing gas under pressure and which will give a warning when the gas pressure within the article falls below a predetermined value.

Another object of the invention is to provide a device which is particularly suitable for use in conjunction with a valve stem of a pneumatic tyre and which will give a warning when the pressure of air within the tyre falls below a predetermined value.

In the following description and claims the term inflatable article is intended to refer to any article which is capable of containing gas under pressure as well as a pneumatic tyre for a motor vehicle.

While the device will normally be used in conjunction with the filling valve of the inflatable article nevertheless the device can if desired be separately attached to the article in a manner that it will operate independently of the filling valve.

Accordingly, the invention may be said to comprise a gas-pressure operated warning device adapted for attachment to an inflatable article said device comprising a housing and associated mechanism to allow gas below a critical pressure to exhaust from the said article and be vented from the housing into the atmosphere by way of an expansion chamber in such a manner as to produce an audible signal.

According to a further aspect, the invention may be said to comprise a gas-pressure operated warning device adapted for attachment to an inflatable article, said device comprising a housing with associated mechanism to allow air to be pumped through the device into the inflatable article and to allow air within the inflatable article below a critical pressure to exhaust from the inflatable article and be vented from the housing into the atmosphere by way of an expansion chamber in such a manner as to produce an audible signal.

One preferred embodiment of the invention will now be described with reference to the accompany drawings in which :

FIG. 1 is a sectional elevational view of the device in a partly disassembled state and indicating the internal mechanism in one stage of operation, and FIG. 2 is a sectional elevational view of the device and indicating the internal mechanism in another stage of operation.

Referring to the drawings the device as depicted is particularly suitable for use in conjunction with the filling valve of a pneumatic tyre. In such construction the device is preferably fabricated from a light-weight plastics material such a polypropylene but it will be realised that other rigid light-weight materials, such as aluminum alloys, may equally well be used.

The device as shown consists of two parts, namely, a mechanism housing indicated generally at 1 and a detachable expansion chamber indicated at 2.

The mechanism housing 1 is cylindrical in shape and has an associated valve casing 3 which is directly attachable to the filling valve (not shown) of an inflatable article, which in the case of a pneumatic tyre would require an internal thread 4. This valve casing 3 is press-fitted into the mechanism housing 1 so as to provide an air-tight seal between the casing and housing at 5. The valve casing 3 is likewise cylindrical in shape and has a partial closure 6 at its lower end in which is formed an opening 7. A washer-type seal 8 which has an axial hole 8a is accommodated inside the lower end of the valve casing 3 and extends around the perimeter of the opening 7. In use, the valve casing is screwed down hard onto the valve stem of the pneumatic tyre so that an air-tight seal is formed between the end of the stem of the valve and the partial closure 6 by reason of the washer 8.

A valve-seal 9 in the form of a disc with an axially depending stem 10, is situated within the confines of the mechanism housing 1, beneath the opening 7 in the valve casing 3. The disc 9 is of a diameter which is in excess of the diameter of the opening 7 and has a resilient washer 13 which is attached to it and which is adapted to contact a seat 13a.

The stem 10 projects into a secondary chamber 12 which is coaxial with the main housing chamber 11 but which is of a considerably smaller diameter.

The secondary chamber 12 has an outlet in the form of an axial bore 14 in which a plunger member 15 has a sliding fit. The plunger member 15 has a head in the form of a disc 15a which limits the downward movement of the member by contacting a seating 16 formed at the junction of the secondary chamber 12 with the bore 14. As shown in the drawings the plunger member has an axial bore 15b to allow free passage of air into the chamber 12.

A helical compression spring 17 is located between the underside of the valve 9 and the upper surface of the head of the member 15. The spring 17 has one end telescoped over the stem 10 of the valve-seal 9 and its opposite end rests on the head 15a of the member 15. The said spring 17 tends to move the valve 9 and its associated washer 13 away from the seat 13a as will be hereinafter further described.

The outlet 14 communicates with an enlarged opening 18 formed in the base section of the mechanism housing, the opening being defined by a radial wall 18a which terminates at a nozzle 18b. As shown in the drawing the plunger member 15 extends through the opening 18 and terminates within the expansion chamber 2 for the purpose to be hereinafter described.

The detachable expansion chamber 2 comprises two principal parts, that is an attachment section 19 and an audible signal producing section 20.

The attachment section 19 is essentially an open-ended barrel-shaped arrangement with an internal thread 21 which complements an external thread 22 formed on the mid-section of the mechanism housing 1. The base portion 23 of the attachment section 19 which divides the expansion chamber into its sections 19 and 20 is formed with an outlet port 24 to allow air to exhaust from the attachment section into the audible signal producing section 20.

The audible signal producing section 20 is simply a chamber shaped in such a manner as to emit whistle when air under pressure within the chamber is vented into the atmosphere by way of the opening 25. The size of the audible signal producing chamber 20, the port 24 and the opening 25 may be varied to suit the lever of noise required. The point at which the signal is sounded will be decided by the strength of the helical compression spring 17.

In the following description of the operation of the device it is to be assumed that the device is to be attached to the existing valve of a pneumatic tyre. The valve is firstly removed from the valve stem of the tyre and the housing 1 is screwed onto the valve stem by engaging the thread 4 onto the thread of the valve stem. The mechanism thus takes the place of the normal valve. The housing is screwed tightly onto the valve stem so that an air tight seal is formed with the washer 8, the valve stem and the valve casing 3. The expansion chamber 2 is unscrewed from the housing 1 and the air hose is applied to the nozzle 18b. This application will move the plunger 15b in an upwardly direction and thus lift the valve head 15a off its seat. Air under pressure may then flow from the air hose through the bore 15b and into the secondary chamber 12. The lifting force exerted on the underside of the head of the valve 9 by the spring 17, combined with the pressure of the air within the secondary chamber 12 will ensure that the valve 9 will remain unseated as is shown in FIG. 1. Air under pressure may then pass into the type by way of the housing chamber 11, the opening 7 and the interior of the valve casing 3.

When the tyre has been inflated to the desired pressure, the air hose is removed from the nozzle 18b. Since the air within the tyre is at a pressure greater than atmospheric, the air will tend to escape in a reverse direction through the valve. However this will force the head of the valve seal 9 onto its seat and thus prevent the escape of any further air. At the same time the compressive effect on the spring 17 will move the plunger member 15 to the position shown in FIG. 1. The pressure of air within the chamber 11 will be sufficient to maintain the seal between the washer 13 and the seat 13a. The expansion chamber is next screwed fully home onto the appropriately screw threaded portion 22 of the housing 1. During such action the lower end of the plunger member 15 will contact the base portion 23 and as the expansion chamber is being screwed onto the housing 1, the plunger member 15 will be lifted upwardly. Simultaneously, the helical compression spring 17 will be further compressed and will exert an additional pressure on the underside of the head of the valve-seal 9. The internal air pressure of the tyre acting on the top of the valve-seal 9 provided it is above the predetermined minimum level, will normally be sufficient to overcome the pressure of the helical spring 17 with the result that the valve-seal 9 will remain firmly seated to form an air-seal between the main housing chamber 11 and the secondary chamber 12.

When the air pressure within the tyre falls below a critical predetermined value, the compression force of the helical spring will unseat the valve-seal 9 and air within the tyre will flow past the valve-seal 9 into the secondary chamber 12 into the bore 15b of the plunger member 15 into the opening 18 then through the port 24 and be vented into the atmosphere through the opening 25 and thus cause an audible signal to be emitted. The signal will continue until the internal and external pressures acting on the tyre are equalised or until the expansion chamber is removed. The removal of the expansion chamber will allow the plunger member 15 to drop and thus release part or all of the compression on the spring to enable very slight internal air pressure within the tyre to remake the seal between the washer 13 and the seating 13a. Thus the escape of air through the device can be terminated. The point at which the device operates depends upon the strength of the helical spring 17 and it will be readily apparent that a variation in the strength of the spring will vary the operating point of the device.

In this manner, a ready warning is provided to the driver of a vehicle that the tyre pressure is below a critical value.

While the device is intended primarily for use in conjunction with pneumatic tyres of motor vehicles it will be readily apparent taht it can, if necessary with slight modification, be used also for any article which depends on maintaining a degree of internal gas pressure, but in which it would be desirable that some warning be given in case the pressure falls below a critical level.

What we claim is :

1. A gas-pressure warning device for attachment to an inflatable article, said device comprising a tubular housing; means enabling said housing to be detachably connected in an air-tight manner to the filling valve holder of the inflatable article; a main chamber and a secondary chamber both formed within said housing and arranged in axial alignment with each other; a valve having a head arranged within said main chamber and adapted to engage with a seat formed between the two chambers to thereby seal off said main chamber from said secondary chamber; a tubular plunger member arranged axially of said secondary chamber and projecting from the latter, said plunger having a flange adapted to rest on a shoulder provided within said secondary chamber; a compression spring provided within said secondary chamber and acting between the head of said valve and the flange of said plunger so that said spring tends to move the head of such valve away from the seat between said main and secondary chambers and also to press the flange of the plunger against said shoulder; an expansion chamber having an attachment section and a signal-producing section; means enabling said expansion chamber to be detachably connected to said tubular housing by way of said attachment; a partition provided within said expansion chamber and acting to divide the latter into said attachment section and signal-producing section, said partition being also disposed suchwise that when said expansion chamber has been secured to said tubular housing, the partition will engage with and act to move said tubular plunger inwardly of the secondary chamber of said housing against the pressure of said compression spring; an outlet port formed through said partition; and an opening formed in the signal-producing section of said expansion chamber and arranged adjacent to said outlet port.

2. A warning device in accordance with claim 1 and wherein the means enabling said housing to be detachably connected in an air-tight manner to the filling valve holder of an inflatable article comprises a tubular adaptor secured within the main chamber of said housing, said adaptor having an internal screw-thread for engagement with an external screw-thread on the filling valve holder of the inflatable article to thereby connect the warning device to said article.

3. A warning device in accordance with claim 1 and wherein the head of said valve is provided with a resilient washer through which said head is adapted to contact the seat formed between the main and secondary chambers in said housing.

4. A warning device in accordance with claim 1 and wherein the secondary chamber of said housing has an outlet in the form of an axial bore in which said tubular plunger has a sliding fit, said bore communicating with an enlarged opening defined by an annular wall which forms part of said housing and terminates at a nozzle through which said housing can, after detachment of said expansion chamber from the housing, be connected by an inflation hose to a source of compressed gas.

5. A warning device in accordance with claim 1 and wherein the attachment section of said expansion chamber is formed with an internal screwthread adapted to engage with an external screw-thread formed on the midsection of said housing to thereby detachably connect said expansion chamber to said housing.

* * * * *